March 6, 1962  P. HUGON  3,024,462

RADIO AIDS TO NAVIGATION

Filed Dec. 18, 1957  3 Sheets-Sheet 1

March 6, 1962 P. HUGON 3,024,462
RADIO AIDS TO NAVIGATION
Filed Dec. 18, 1957 3 Sheets-Sheet 3

United States Patent Office 3,024,462
Patented Mar. 6, 1962

3,024,462
RADIO AIDS TO NAVIGATION
Pierre Hugon, Paris, France, assignor to Compagnie Generale de Telegraphie Sans Fil, a corporation of France
Filed Dec. 18, 1957, Ser. No. 703,562
Claims priority, application France Dec. 20, 1956
9 Claims. (Cl. 343—105)

The present invention relates to navigational methods using equiphase hyperbolic position lines, such as those provided by the well known DECCA Navigator System.

Broadly, such systems operate in the following way. Electromagnetic waves are transmitted by several transmitters in order to create over a predetermined area an ideal network of hyperbolic lines intersecting to form a grid or lattice and along which the phase of the waves propagating from two different transmitters is equal. This equality is indicated by suitable indicators which in the DECCA system are often called "decometers." The indicators also indicate the phase shift between the two signals while the interval between two equiphase hyperbolae is being crossed.

By means of such indicators a ship sailing at sea, an aircraft flying in air or a vehicle moving on ground can at any instant be informed of the hyperbola on which it is at that instant. To determine two hyperbolae passing through the point where the considered vehicle is at a given instant makes it possible to take at any instant the fix of this vehicle. In the following description the system will be described as used by a ship. However, it is obvious that the system is applicable to any medium of locomotion such as planes, ships, cars, etc. The word navigator will be used to designate the person who takes the fix of the ship or vehicle used.

Such systems, by enabling the navigator to fix his geographical position at every instant, provide a navigational method based on the constant taking of the fix of the ship, i.e. a method of navigation by observing the successive fixes of the ship.

The invention has for its object to improve the above navigational method by making it possible for the navigator constantly to keep his course in the right direction, thus transforming the above navigational method into a dead-reckoning navigational method.

To this end, instead of measuring the phase difference, the variation speed of the phase difference is considered while the ship is crossing the hyperbolic lattice. This speed is the highest if the route followed is the shortest distance between two adjacent hyperbolae and is null if the course taken is tangent to a hyperbola. For any intermediate course, this speed assumes a value comprised between these two extremes.

The process according to the invention, may comprise the following steps:

(1) The navigator plots the course to be followed on a map bearing an hyperbolic battice;

(2) By means of conventional indicators, or decometers, he fixes the initial position of the ship;

(3) From the known speed of the ship he calculates the variation speed of the phase difference corresponding to the route he intends to make the ship follow;

(4) He applies to the decometer pointer a torque of a nature to cause the pointer to rotate in a direction opposite to its normal rotation direction at an angular velocity equal to the variation speed of the phase difference.

Under those conditions, if the navigator steers the ship in such a way that the indicator pointer remains motionless, this obviously indicates that the ship runs the right course.

According to a simplified embodiment of the invention, the navigation method it provides comprises the following steps:

(1) The navigator ascertains at a given instant that the ship runs the desired course, this being done by means of any suitable conventional equipment such as a steering compass;

(2) The navigator then registers the speed of the decometer pointer, for instance by causing a disc to rotate in synchronism with this pointer;

(3) This being done, it suffices, in order to make the ship run the right course, to steer it in such a way that this synchronism be maintained.

According to the two above variations of the navigation method of the invention, use is made of one set of equiphase hyperbolae. According to a further modification, both sets of hyperbolae forming the hyperbolic grid are used, whereby the navigation method is made independent of the speed of the ship.

It is also an object of this invention to provide the equipment necessary to put the above process into effect.

According to one embodiment of this equipment, means are provided for mechanically imparting a rotary motion, having the speed of the phase shift variation, corresponding to the course which it is desired to run, to the normally fixed armature of the conventional DECCA or similar phase indicator, this motion being in a direction opposite to the normal rotation direction of the pointer, whereby both motions are accurately balanced and the pointer kept motionless if the route followed by the ship is the correct one.

According to a modification, the opposing torque is applied electrically. According to a further modification, means are provided for registering the speed of the decometer pointer, once it has been ascertained by any conventional method that the course run by the ship is the correct one, the steering consisting then in causing the pointer to keep this rotation speed.

Other advantages and embodiments of the invention will be described hereinafter with reference to the appended drawing, wherein:

FIG. 1 illustrates the general principle of the invention;

FIG. 2 diagrammatically shows a mechanical embodiment of a device used for carrying the method of the invention into effect;

FIGS. 3, 4 and 5 diagrammatically show a further embodiment of the device for carrying the invention into effect;

FIG. 6 is a further modification of the device according to the invention;

FIG. 7 very diagrammatically shows a further embodiment of the device according to the invention;

Figure 8:
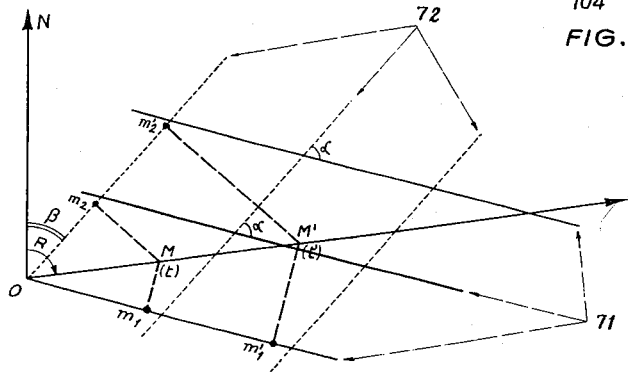
FIG. 8 illustrates the principle governing loxodromic navigation across an area covered by two sets of hyperbolae.
Figure 10:
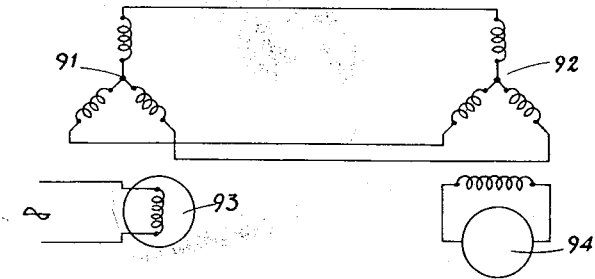

FIG. 10 diagrammatically shows the system of FIG. 8 wherein the above connection is effected electrically.

Figure 1:
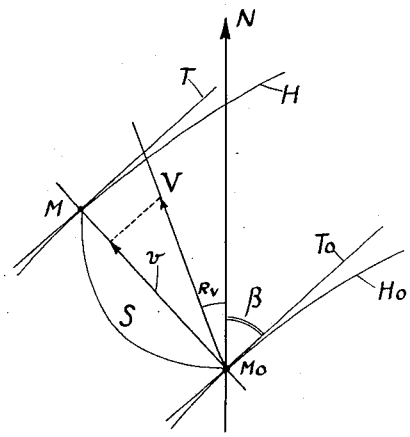

FIG. 1 shows two adjacent hyperbolae portions $H_0$ and $H$.

At a given instant, a ship is assumed to be at a point $M_0$ on hyperbola $H_0$. The course intended for the ship is indicated by velocity-vector $M_0V$, forming an angle $R_V$ with the geographic meridian $M_0N$. Straight line $M_0M$ is the shortest distance between the two hyperbolae. The straight lines $M_0T_0$ and $MT$ are tangent to the hyperbolae at $M_0$ and $M$ respectively. In practice, along a limited route portion, they may be considered as parallel lines. Line $M_0M$, which will be hereinafter designated as the "normal common to the two hyperbolae," is the distance between the parallel $M_0T_0$ and $MT$. The velocity vector $M_0V$ projects as $v$ on the common normal $M_0M$, the two tangents forming respectively an angle with the meridian $M_0N$.

As has been recalled at the outset of the present specification, conventional indicators indicate the phase shift corersponding to any position of the ship within a lane limited by two adjacent equiphase hyperbolae. If the course followed by the ship while crossing a lane is along normal $M_0M$, the angular velocity of the pointer of a phasemeter indicating the above phase shift is the mean varition speed $\omega_m$ of this phase shift. This speed depends upon the speed $V$ of the ship and varies more or less rapidly according to the spacing between the hyperbolae of the set, i.e. is a function of the breadth of the lane being crossed by the ship. This speed is expressed by the equation:

$$\omega_m = \frac{2\pi \cdot V}{S} \quad (1)$$

$S$ being the width of the lane being crossed at the point considered and $V$ the speed of the ship. For any other given course, the value of $\omega_m$ is obtained by replacing $V$ in the Expression 1 by its projection $v$ on the common normal $M_0M$. The period necessary for one complete rotation of the phasemeter pointer is in this case:

$$T = \frac{S}{V \sin (R_V \pm \beta)} \quad (2)$$

where $R_V$ is the angle of the course of the ship with the meridian and $\beta$ is the angle of the hyperbolae with the meridian in the region considered.

Equation 2 shows that, for a given course and a constant speed, this period depends only on the structure of the set of hyperbolae plotted on the map.

Under these conditions, if the meter armature carrying the coils which cause the meter pointer to rotate, is caused to rotate in a direction opposite to that of the pointer, the angular velociy of this movement being equal to the means variation speed of the phase difference corresponding to the course to be followed, the pointer will keep motionless if this course is actually followed. Thus, in order to keep the ship on the desired route, it will suffice to steer it in such a way that the pointer be kept motionless.

The indicator mechanism for carrying into effect the navigational method according to the invention may of course be realized in many ways.

It may for instance be obtained by adequately modifying a conventional phase indicator used in carrying into practice the DECCA method or decometer.

Figure 2:
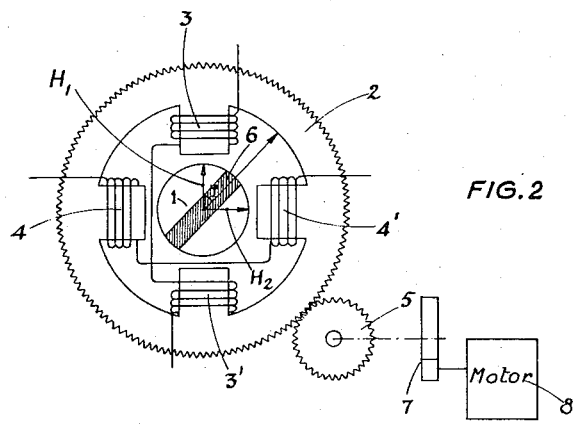

FIG. 2 very diagrammatically shows, a decometer of a conventional type.

Such meters usually comprise a soft iron disc 1, magnetized along a diametral portion thereof as represented by a hatched zone 6 in FIGURE 2, and adapted to be oriented within soft iron armature 2 by the rotating field represented by vectors $H_1$ and $H_2$ such that $H_1 = H_0 \cos \varphi$ and $H_2 \sin \varphi$, $H_0$ being the maximum amplitude of the rotational vector. This rotating field is created by two pairs of stationary coils 3, 3′ and 4, 4′, placed at right angles to each other and fed by the signals respectively derived from those transmitted by two transmitters used to provide a set of hyperbolic equiphase lines.

The same indicator is used to put into practice the method according to the invention, by compensating the rotating movement of its pointer by means of a mechanical system or by generating a counteracting rotary magnetic field.

According to one embodiment of the invention, the zero setting system, sometimes provided in decometer indicators, is used. The whole armature is caused to rotate, thus keeping the pointer at zero. This movement is produced by a gear system comprising a gear rim 2 and a gear wheel 5. In conventional decometers, the amplitude of this movement corresponds to half a lane. According to the invention, this gear system is used to rotate the armature and the windings at the angular velocity determined as explained hereinabove and equal to the phase variation speed corresponding to a predetermined route to be followed at a predetermined sailing speed.

This movement can, for instance, be obtained by means of a clockwork but is preferably provided by a small motor and a reducing gear diagrammatically shown at 7 and 8, respectively. The speed of this motor is adjustable. A relative accuracy of the order of 1/50 is generally sufficient.

Figure 3:
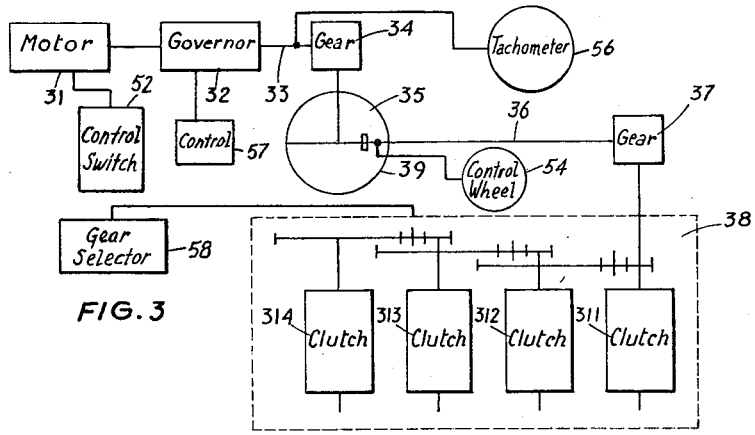

FIG. 3 shows in a very diagrammatic fashion a specification of the above system. It comprises a universal electric motor 31 which drives a centrifugal governor 32 developing on its shaft 33 a speed of 3000 r.p.m. with an accuracy of ±1%. This governor controls a reducing gear 34 which drives a disc 35 of a roller variator 39. The speed of the output shaft 36 of variator 39 varies a ratio of 1 to 5. This shaft drives, through another reduction gear 37, a four speed gear box diagrammatically indicated at 38. This gear box contains four electromagnetic clutches 311, 312, 313 and 314 corresponding to four speeds respectively.

Figure 4:
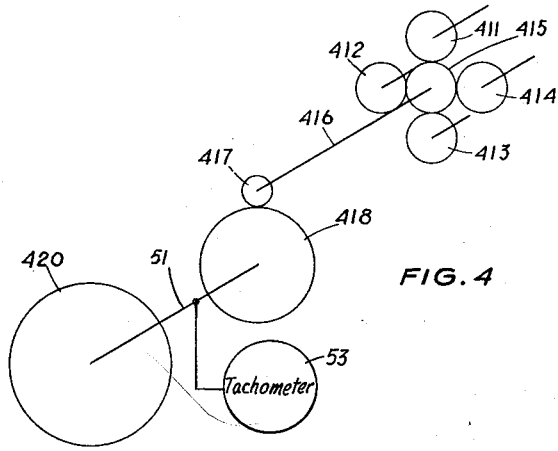

These clutches are diagrammatically represented in FIG. 4 by pinions 411, 412, 413 and 414, respectively. They are adapted for selectively driving a gear 415 which controls the output shaft 416 of the gear box. This shaft drives a piar of gear wheels 417 and 418. Output shaft 51 of this gearing down assembly has a speed which, in the embodiment shown, can vary between .0013 r.p.m. and 830 r.p.m. Shaft 51 directly drives armature 420 shown at 2 in FIG 2.

By way of example, the device may be used under the following operating conditions:

Speed $V$ of the ship: between 5 and 15 knots.

Lane width or spacing between two adjacent hyperbolae in the region considered: between 400 and 2000 meters.

Course angle $R_V$: between 1 and 45 degrees.

Figure 5:
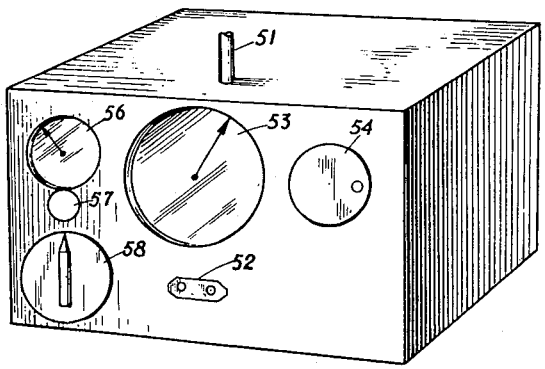

It should be noted that all the elements constituting the assembly, except for decometer 420, may be located in a small cabinet, for instance a rectangular box such as that represented in FIG. 5, the dimensions of which are 400 x 300 x 250 mm. FIG. 5 should be considered in conjunction with FIGS. 3 and 4. This box may thus be readily located under the receiver cabinet such that the output shaft 51, protruding from the box and which is shown in FIG. 4, drives the armature of the modified decometer shown at 2 in FIG. 2 and at 420 in FIG. 4. On the front face of the box are disposed the various controls of the system shown in FIGS. 3 and 4, namely: a double throw switch 52 for starting and stopping motor 31 shown in FIG. 3; a dial 53 which pertains for example to a precision tachometer for indicating the speed of shaft 51 shown in FIG. 4. As has been explained hereinabove, a correct operation of a device according to the invention requires a correct adjustment of the rotational speed of this shaft. To this end are provided a control wheel 54 for controlling the speed of shaft 36 by controlling the position of the roller variator 39; a tachometer 56 for measuring the rotation speed of shaft 33 of governor 32 and a control knob 57 for this governor to compensate for any accidental variation in the supply voltage; and a gear selector 58 which controls the gear box 38.

The above described device is operated in the following way:

(1) The electrical motor is started by operating switch 52;

(2) The speed of the governor is checked by means of tachometer 56 and, if need be, adjusted by means of knob 57 to 3000 r.p.m.

(3) The speed of output shaft 51 is adjusted by means of selector 58 and variator control 54.

If the ship is then steered in such a way that the meter pointer remains motionless, it follows the desired route.

Figure 6:
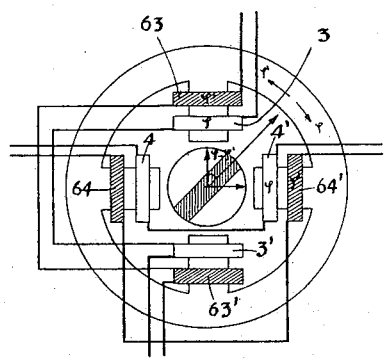

The same result can be obtained by means of an electrical arrangement, such as that diagrammatically shown in FIG. 6. According to this embodiment, a compensating phase-difference $\varphi'$ is introduced by means of auxiliary pairs of coils 63, 63' and 64, 64', respectively located side by side with conventional pairs of coils 3, 3' and 4, 4' which control the rotation of the meter pointer. Phase difference $\varphi'$ is a function of the speed with which varies the phase shift between the two transmitted signals, as indicated hereinabove. It generates a torque opposite to that causing the pointer to rotate. Here again, the only thing the navigator has to do, to cause the ship to sail along the desired course, is to steer it in such a way that the decometer pointer constantly remains stationary.

It is generally preferred that the pointer be kept in vertical position. Theory and experience show that, insofar as accuracy and sensitivity is concerned, it is preferable to put the device into operation when the ship has crossed one quarter of a lane.

By way of example, it can be indicated that, in the case of a ship sailing at a speed of 20 knots, if $R_V \pm \beta = 60°$ and if the lane width is one mile, which is a plausible value when the ship is at a distance of the order of 200 miles from the transmitters, the calculated speed $\omega_m$ is of about ⅓ r.p.m. When the device described is used on board an aircraft flying at a speed of 200 miles per hour for instance, the calculated speed $\omega_m$ is of the order of 8 r.p.m. Both values are quite acceptable and suitable for the operation of the device.

Figure 7:
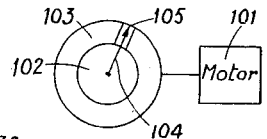

According to a further modification, which is very diagrammatically shown in FIG. 7, there is provided a rotatable disc 103 which is coaxial with the dial of a conventional decometer 102 and is driven by a motor 101, the speed of which is adjustable within broad limits. Upon checking in any appropriate way, for example by means of a steering compass, that the course followed by the ship at a given instant is the correct one, the navigator sets in motion disc 103 by means of motor 101, in such a way that dial pointer 104 and disc 103 rotate in synchronism. The navigator will then only have to steer in such a manner as to maintain in front of each other pointer 104 and an appropriate index 105 provided on disc 103.

According to a still further embodiment of the invention, both sets of hyperbolae forming the hyperbolic grid are used. FIG. 8 shows a portion of the area covered by this grid. The hyperbola segments 71 and 72 comprised in such limited grid portion may be considered as parallel straight lines which intersect at an angle $\alpha$. Hyperbolic lines 72 form with the meridian ON an angle $\beta$. The route followed by the ship is a loxodromy OM' intersecting meridians such as ON at an angle R. This ship is at point M at an instant $t$ and at point M' at an instant $t'$.

Under these conditions, it may be shown that the respective projections $m_1m'_1$ and $m_2m'_2$ on hyperbolic lines 71 and 72, or on their respective common normals, of the distance covered on the loxodromy are in a constant ratio, i.e. that, at any instant.

$$\frac{m_1m'_1}{m_2m'_2} = \text{constant}$$

It follows that the respective rotation speeds of the decometers, corresponding to the two sets of hyperbolae forming the grid, are in a constant ratio as long as the lane width and the intersecting angle of the hyperbolae are not modified. In this case:

$$\frac{\omega_1}{\omega_2} = \frac{S''}{S'} \cdot \frac{\sin(R_V \pm \beta)}{\sin(R_V \pm \beta - \alpha)} = K$$

wherein K is a constant, $\omega_1$ and $\omega_2$ are respective angular velocities of the two decometers and S' and S'' respective lane breadths. This ratio is independent of the speed of the ship and defines without ambiguity the route to be run by the ship.

Figure 9:
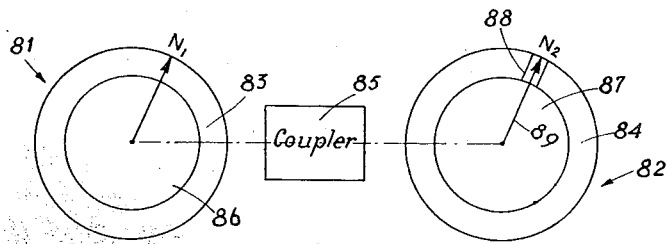
FIG. 9 is a schematic view of the decometers used in the latter case and the respective speeds of which are mechanically tied to each other.

In this embodiment of the invention, two phasemeters or decometers, 81 and 82, corresponding to the two hyperbola sets 71 and 72 respectively, are used in cooperation. They are very diagrammatically shown in FIG. 9. These decometers comprise respectively rotatable discs 83 and 84, concentric with the respective indicator pointers. Disc 83 is rigidly mounted on the shaft which supports disc 86, while discs 84 and 87 are mounted for rotation independently of each other. In addition, discs 84 and disc 83 are coupled to each other by any suitable means 85, which may be mechanical or electrical, with a transmission ratio having the above obtained ratio K. As indicated above, ratio K defines a predetermined course to be followed across the hyperbolic grid.

The above system is operated in the following way:

The navigator first ascertains by means of any conventional device, such as a steering compass, that the ship runs the desired route at a given instant. He notes the mark 88 in front of which pointer 89 of indicator 82 is at a given instant. It suffices then to steer the ship in such a way that the pointer 89 of indicator 82 permanently remains in front of index 88.

According to a preferred embodiment of the above system, discs 83 and 84 are electrically tied to each other through the intermediary of a selsyn transformer, as diagrammatically shown in FIG. 10. The transmitter of the selsyn system comprises a stator 91 and a rotor 93 which is mounted on the same shaft as discs 83 and 86 of FIG. 8 and rotates at the same speed as these discs. The receiver comprises a stator 92, connected to stator 91 of the transmitter in the usual manner, and a rotor 94. The receiver is designed in such a way that the speed of its rotor 94 is in a constant ratio K with the speed of rotor 93. Rotor 94 drives disc 84.

As can be readily seen, this last described method makes the steering of the ship entirely independent of its velocity, contrary to what occurs when the method making use of one set of hyperbolae only is used.

Of course the invention is not limited to the embodiments described which are given only by way of example and many modifications are possible which are obvious to anybody skilled in the art.

What I claim is:

1. In a system for controlling the displacement of a body moving across an area wherein hyperbolic equiphase lines defining channels are provided by means of signals transmitted by at least two transmitters: first means for constantly measuring the phase shift between the signals respectively received from said two transmitters by said body; second means for manifesting the predetermined velocity of the varaition of said phase shift along a predetermined course across predetermined channels; and third means operatively assocated with said first and second means for constantly comparing said predetermined velocity and the actual velocity of the variation of said phase shift.

2. In a system for controlling the displacement of a body moving across an area wherein hyperbolic equiphase lines defining channels are provided by means of signals transmitted by at least two transmitters: means for constantly measuring the phase shift between the signals respectively received from said two transmitters by said body, said means comprising a pointer whose shift with respect to an initial position indicates said phase shift; means responsive to the predetermined velocity of variation of said phase shift along a predetermined course across predetermined channels for opposing the displacement of said pointer with respect to said initial position; and means for constantly manifesting the amount of the resulting displacement of said pointer with respect to said initial position.

3. In a system for controlling the displacement of a body moving across an area wherein hyperbolic equiphase lines defining channels are provided by means of signals transmitted by at least two transmitters: means for constantly measuring the phase shift between signals respectively received from said two transmitters by said body, said means comprising a pointer adapted to be shifted from its zero position in proportion to the measured phase shift and means for relatively shifting said pointer towards said zero position as a function of the predetermined velocity of variation of said phase shift along a predetermined course across predetermined channels.

4. In a system for controlling the displacement of a body moving across an area wherein hyperbolic equiphase lines defining channels are provided by means of signals transmitted by at least two transmitters: phasemetering means for constantly measuring the phase shift between the signals respectively received from said two transmitters by said body, said means comprising a dial and a pointer movable in front of said dial; means for moving said dial in a direction opposite to the direction of displacement of said pointer as a function of the predetermined velocity of variation of said phase shift along a predetermined course across predetermined channels to keep said pointer in zero position when the velocity of variation of the measured phase shift is equal to said predetermined velocity.

5. In a system for controlling the displacement of a body moving across an area wherein hyperbolic equiphase lines defining channels are provided by means of signals transmitted by at least two transmitters: means for constantly measuring the phase shift between the signals respectively received from said two transmitters by said body, said means comprising a pointer and coils for shifting said pointer from its zero position in proportion to the current flowing through said coils, said current being a function of said phase shift; further coils for shifting said pointer towards its zero position as a function of the current flowing therein and means for feeding to said further coils a current proportional to the predetermined velocity of said phase shift variation along a predetermined course across predetermined channels.

6. A process for controlling the displacement of a body moving across an area wherein hyperbolic equiphase lines defining channels are provided by means of signals transmitted by at least two transmitters, said process comprising the following steps: measuring the phase shift between said signals, determining the velocity of the variation of said shift for a predetermined route across predetermined channels, comparing the velocity of said phase shift variation and said determined velocity, and steering said body in a direction in which the velocity of variation of said phase shift is constantly maintained equal to said predetermined velocity.

7. In a system for controlling the displacement of a body moving across an area wherein hyperbolic equiphase lines defining channels are provided by means of signals transmitted by at least two transmitters: means for constantly measuring the phase shift between the signals respectively received from said two transmitters by said body, said means comprising a movable pointer whose instantaneous position indicates said phase shift; a movable reference mark; and means for impressing to said mark a movement having the same velocity as said pointer movement at a predetermined instant and for maintaining said velocity for providing a constant comparison between said pointer velocity and said mark velocity.

8. In a system for controlling the displacement of a body moving across an area wherein two sets of hyperbolic equiphase lines are provided by means of signals transmitted by at least three transmitters, said hyperbolae defining channels: first and second phasemeters for constantly measuring, in said sets of hyperbolic lines respectively, the phase shift between the signals respectively received by said body, from the two transmitters generating said set of lines; said phasemeters comprising respective movable pointers whose instantaneous position indicates said phase shifts respectively; in said first phasemeter a movable reference mark; and means for tying the velocity of said reference mark to the velocity of said pointer of said second phasemeter with a predetermined ratio.

9. In a system for controlling the displacement of a body moving across an area wherein two sets of hyperbolic equiphase lines are provided by means of signals transmitted by at least three transmitters, two transmitters generating one set of said lines, said hyperbolae defining channels: first and second phasemeters for constantly measuring, in said sets of hyperbolic lines respectively, the phase shift between the signals respectively received by said body from the two transmitters generating said set of lines; said phasemeters comprising respective movable pointers whose instantaneous position indicates said phase shifts respectively; in said first phasemeter a movable reference mark; and a selsyn transformer comprising a transmitter having a rotor, arranged for rotating at the same velocity as said pointer of said second phasemeter, and a receiver having a rotor, arranged for rotation at a velocity which is in a predetermined ratio with the velocity of said transmitter rotor, said receiver rotor driving said movable reference mark.

References Cited in the file of this patent

UNITED STATES PATENTS

| | | |
|---|---|---|
| 1,562,485 | Affel | Nov. 24, 1925 |
| 2,408,773 | Goodall | Oct. 8, 1946 |
| 2,587,467 | Hawkins | Feb. 26, 1952 |
| 2,814,799 | Hawkins | Nov. 26, 1957 |
| 2,855,595 | Koeppel | Oct. 7, 1958 |